United States Patent [19]
Hawranek

[11] Patent Number: 4,972,052
[45] Date of Patent: Nov. 20, 1990

[54] CONTACT DEVICE FOR DELIVERING ELECTRICAL SIGNALS CORRESPONDING TO THE POSITION OF A MOVABLE BODY

[75] Inventor: Jerzy Hawranek, Vargarda, Sweden

[73] Assignee: Autoliv Development AB, Vargarda, Sweden

[21] Appl. No.: 218,681

[22] PCT Filed: Nov. 17, 1987

[86] PCT No.: PCT/SE87/00539
§ 371 Date: Jul. 14, 1988
§ 102(e) Date: Jul. 14, 1988

[87] PCT Pub. No.: WO88/04027
PCT Pub. Date: Jun. 2, 1988

[30] Foreign Application Priority Data
Nov. 17, 1986 [SE] Sweden ................ 8604914

[51] Int. Cl.$^5$ ............ H01H 19/54; G01B 7/00
[52] U.S. Cl. ................... 200/11 R; 200/52 R
[58] Field of Search ............ 200/5 A, 6 A, 11 R, 200/11 DA, 11 TW, 52 R, 292, 275, 512-517

[56] References Cited

U.S. PATENT DOCUMENTS

| | | | |
|---|---|---|---|
| 4,037,116 | 7/1977 | Hodama | 200/11 DA X |
| 4,246,452 | 1/1981 | Chandler | 200/6 A X |
| 4,297,542 | 10/1981 | Shumway | 200/6 A |
| 4,443,670 | 4/1984 | Nakamura et al. | 200/11 DA |

FOREIGN PATENT DOCUMENTS

| | | |
|---|---|---|
| WO84/03763 | 9/1984 | PCT Int'l Appl. . |
| 8602892.5 | 12/1987 | Sweden . |
| 2132359 | 7/1984 | United Kingdom . |

OTHER PUBLICATIONS

W. M. Davis, *IBM Technical Disclosure Bulletin*, "Water Switch", vol. 18, No. 10, Mar. 1976, pp. 3405, 3406.

J. W. Rudolph; *IBM Technical Disclosure Bulletin*, "Sliding Selector Switch", vol. 22, No. 6. Nov. 1979, pp. 2324, 2325.

*Primary Examiner*—J. R. Scott
*Attorney, Agent, or Firm*—Spencer & Frank

[57] ABSTRACT

A contact device for delivering electrical signals corresponding to the movement of a movable body having two opposing layers including a base layer and a flexible layer spaced from the base layer. An electrical input conductor attached to one of the two layers and is electrically connected to a power source. The device also includes an electrical output conductor attached to one of the layers for transmitting an electrical signal when the output conductor is electrically connected to the input conductor. A plurality of contact elements are attached to one of the layers for electrically connecting the input conductor to the first output conductor. A pressure device attached to the movable body moves along a path defined by at least one of the conductors, abuts the flexible layer and displaces the flexible layer toward the base layer. Thereby, the input conductor and the output conductor are electrically connected by means of at least one of the contact elements, whereby an electrical signal is generated in the output conductor when the pressure device displaces the flexible layer toward to base layer.

10 Claims, 1 Drawing Sheet

CONTACT DEVICE FOR DELIVERING ELECTRICAL SIGNALS CORRESPONDING TO THE POSITION OF A MOVABLE BODY

FIELD OF THE INVENTION

The present invention relates to a contact device for delivering electrical signals corresponding to the position of a movable body. The contact device is primarily intended for use in position indicators and angle indicators but can also be used in other types of indicators, where it is desirable to produce electrical signals corresponding to the position of a movable body.

TECHNOLOGY REVIEW

It is known to use contact devices to produce electrical signals corresponding to the movement of a body, for example, in revolution counters for motors or in angle position indicators for bodies rotating or turning around a shaft. The contact devices presently in use for this purpose comprises a large number of separate, movable contact means and therefore take up a comparatively large amount of space. They are also comparatively heavy and expensive to manufacture and assemble.

SUMMARY OF THE INVENTION

The main object of the invention is to provide a contact device which requires a very small space, which has a very low weight and which is inexpensive to manufacture and, may easily be adapted to different components and fields of application.

The contact device includes a base layer and a flexible layer. These layers are provided with electrical conductors and contact elements which gradually may be brought into electrical contact with each other by pushing the flexible layer against the base layer by means of a pressure element movable over the surface of the flexible layer. Due to the fact that the layers and the electrical conductors can be made very thin, the contact means requires only a very small space. Furthermore, the contact means has a very low weight and is easy to manufacture. Due to the fact that the shapes of the layers and the conductors can be varied, the contact device can easily be adapted to different components and fields of application.

BRIEF DESCRIPTION OF THE DRAWINGS

Embodiments of the invention will now be further described below with reference to the accompanying drawings.

DESCRIPTION OF THE PREFERRED EMBODIMENTS

Figure 1:
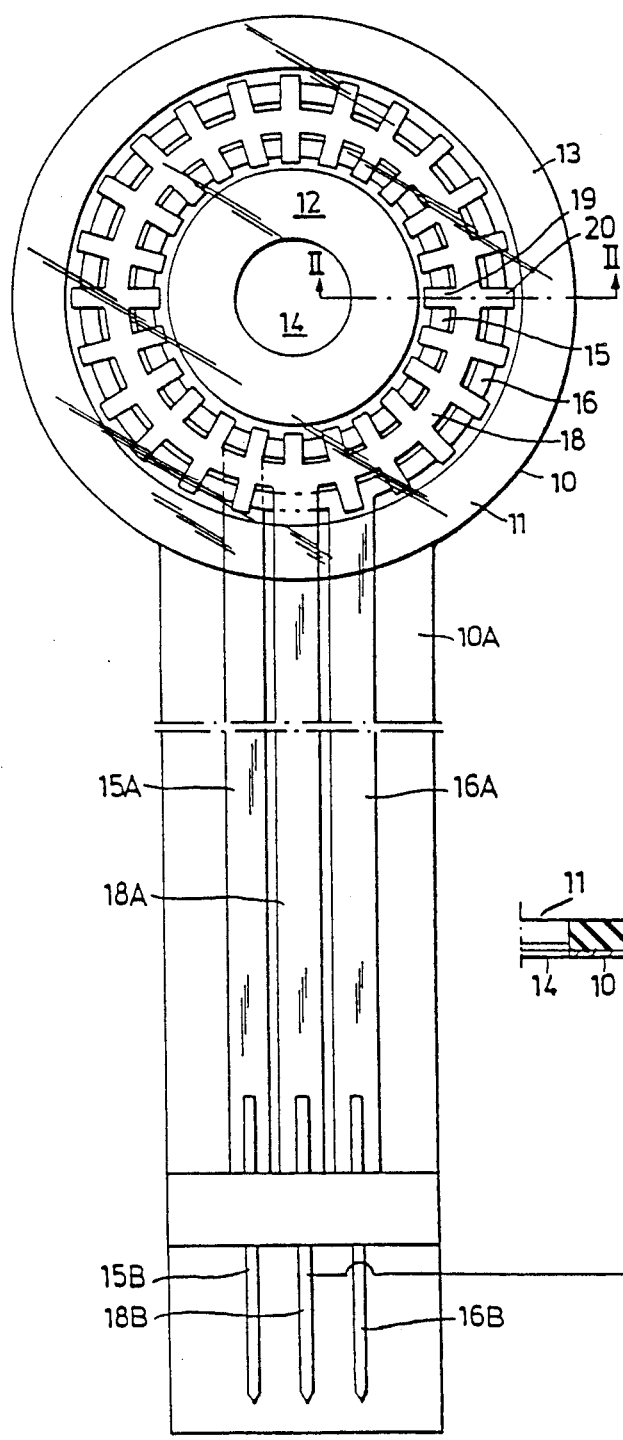
FIG. 1 is a schematic view of one embodiment of a contact device according to the invention which is designed for producing pulses in a rotating motor for counting the number of revolutions and/or for indicating the angle position of the motor shaft.
Figure 2:
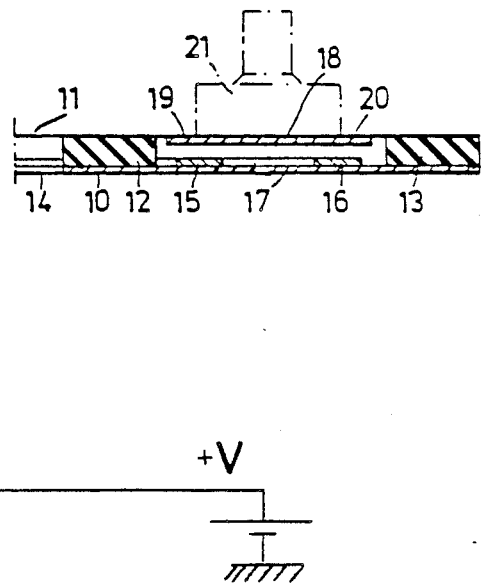
FIG. 2 is a schematic sectional view through the contact device of FIG. 1 along the line II—II.

The contact device shown in FIGS. 1 and 2 comprises a base layer 10 and a flexible layer 11. The flexible layer 11 is positioned in front of the base layer 10 and is spaced from the base layer by means of two spacing elements 12,13. The base layer 10 has a circular shape with a central hole 14 and is provided with two elongated electrical output conductors 15,16 on the side facing the flexible layer. The electrical conductors are positioned between the spacing elements 12 and 13 and form concentric circular rings around the central hole 14. The outer diameter of the inner ring is substantially smaller than the inner diameter of the outer ring, so that a space 17 is formed between the output conductors 15 and 16. The flexible layer 11 has a central hole corresponding to the central hole 14 of the base layer and is provided with an elongated electrical output conductor 18 on the side facing the base layer. The electrical input conductor 18 forms a circular ring which is concentric with the conductors 15,16. The inner diameter of the conductor 18 is larger than the outer diameter of the conductor 15, and the outer diameter of the conductor 18 is smaller than the inner diameter of the conductor 16. The conductor 18 is positioned straight over the space 17 between the conductors 15,16, so that the conductor 18 can be placed in the space 17 between the conductors 15,16 without touching the conductors 15,16, when the layer 11 is pushed down.

The conductor 18 is provided with a large number of tabs 19,20 projecting perpendicularly to the longitudinal direction of the conductor, i.e. radially with regard to the circular ring formed by the conductor. The tabs 19,20 have a length such that they at least partially overlap the conductors 15,16 provided on the base layer. Thus, when the flexible layer 11 is pushed down, the tabs 19 projecting radially inwards will come into contact with the inner conductor 15 and the tabs 20 projecting radially outwards will come into contact with the outer conductor 16 on the base layer. The tabs 19,20 are positioned radially in front of each other.

The conductors 15,16 and 18 are connected to connectors 15A,16A and 18A provided on a strip 10A projecting from the base layer. The connectors 15A,16A and 18A are insulated from each other and from the other conductors and at their ends provided with terminals 15B,16B and 18B.

The base layer 10 and the flexible layer 11 may be very thin layers, for example of plastic foils, and the conductors 15,16,18 and their connectors may be thin metal layers. Because the distance between the conductors 15,16 on one side and the tabs 19,20 of the conductor 18 on the other side only has to be large enough to prevent an electrical contact between the conductors, when the flexible layer is not pushed down, the complete contact device can have a very low device. Thus, the required space for the height is very small, even when it is used with a pressure element 21 schematically indicated with broken lines in FIG. 2. The pressure element 21 is useful for pushing down the flexible layer 11, as will be more clearly explained below.

The contact device shown in FIGS. 1 and 2 is designed to be attached to an electric motor to count the number of revolutions and portions of a revolution that the motor shaft has turned from a starting position, for example. The contact device is in this case attached to one end surface of the motor in a plane which is perpendicular to the motor shaft. The motor shaft is provided with an arm or disc which rotates with the motor shaft and has a pressure element which abuts against the flexible layer of the contact device. The pressure element 21 is adapted to slide over the conductor 18 and its projecting tabs 19,20, which act as contact elements, and gradually force the tabs 19,20 into contact with the conductors 15,16 on the base layer, when the motor rotates. The terminal 18B of the electrical input conductor 18 is connected to a voltage supply and a pulse is then generated on the terminals 15B and 16B each time the output conductors 15 and 16, respectively, come into contact with a projecting tab on the conductor 18. The number of received pulses is a direct indication of the number of revolutions and portions of a revolution that the motor shaft has turned.

When the pressure element 21 slides over the conductor 18 and its projecting tabs 19,20, the flexible layer 11 is pushed down under the pressure element, so that the portion of the conductor 18 lying under the pressure element is forced against the base layer. In the areas where no projecting tabs are present, the conductor 18 will be pushed down into the space 17 between the conductors 15,16 without contacting any of the conductors 15,16. However, each time the pressure element passes over the projecting tabs 19 or 20 on the conductor 18, these tabs and thus also the conductor 18 will be brought into contact with the conductors 15,16. Thus, for each revolution of the motor shaft the tabs 19,20 of the conductor 18 will gradually come into contact with the conductors 15 and 16, respectively, so that pulses are transmitted over the terminals 15B and 16B, respectively.

In addition to the embodiment of the invention illustrated in FIG. 1 and described above, it is obvious that many modifications and variations are possible within the scope of the invention. For example, the electric conductors can run in a substantially straight line or along any curve, and the contact device can then be used as position indicator for bodies or elements movable from one point to another. For example, in motor vehicles, the device may be used to indicate the position of movable chairs; in connection with locking means in automatic seat belt systems, and in height adjusters for safety belts. Although the embodiment shown in FIG. 1 uses three conductors, once electrical input conductor and two output conductors, in another embodiment, the invention could have as few as two conductors, one input conductor and one output conductor. When using only two conductors, both conductors may be applied on the same layer, for example the flexible layer, in this embodiment the base layer would be contact elements or tabs which the conductors and the conductors would be forced against the crossing contact elements, when the pressure element is moved over the flexible layer. Alternatively, one conductor could be applied on one layer and the other output conductor may be applied on the other layer. In this embodiment of the said conductors in then provided with projecting tongues or tabs which form contact elements and which are brought into contact with the other conductor, when the pressure element is moved over the flexible layer. However, even though as few as two conductors may be used, using three conductors provides advantages such as greater control of the movement of a body between two points. The use of two parallel conductors for the output pulses shown in the disclosed embodiment provides a higher reliability in the pulse count. If the inwards and outwards projecting tabs are displaced with regard to each other, so that the tabs are not positioned on the same radius, two different series of pulses are obtained which can be used to achieve, a higher accuracy in determining a position. For example, better accuracy can be achieved when the contact device is used for determining an angle or for determining the direction of rotation. Alternatively, a higher number of tabs can be provided on or to contact one output conductor and the tabs can be positioned with different spacing, so that the pulses from this conductor spacing, as shown in FIG. 9, can be used for speed control of the movable body. For example, a higher number of pulses per time unit would cause the body to accelerate on straight paths and a lower number of pulses would cause the body to slow down, for example, just before a home position, or indicate an angle by means of a code, such as a Gray-code. Furthermore, one output conductor may consist of a resistive layer, so that the resistance of the conductor depends upon the position of the pressure element. This provides the possibility to perform a digital as well as an analog signal output. Alternatively, one conductor can be designed as a resistive temperature sensor, making the contact device self-adjusting, so that the accuracy in indication of a position or an angle is increased, when the temperature changes heavily.

The base layer may be flexible or rigid and possibly consist of a surface on the component to which the contact device is to be attached. The conductors and contact elements required on the base layer are then applied directly on the surface of the component.

Because the contact device comprises a flexible layer on which one or more conductors and/or one or more contact elements are provided, the contact device may be completely sealed completely sealing the device increases the service life of the device and reduces the risk of contact problems, particularly in dirty environments, for example in motor vehicles. Because the conductors can have any shape, the contact device is easy to adapt for the intended field of application. In addition the small space required makes a contact device according to the invention easy to insert into units already manufactured, for example finished motors.

I claim:

1. A contact device for delivering electrical signals corresponding to the movement of a movable body, comprising:

two layers including a base layer and a flexible layer, said flexible layer being positioned in front of the base layer and spaced from the base layer by a spacing means, one of said two layers being provided with a first elongated electrical conductor and the other of said two layers being provided with a plurality of contact elements which are arranged so that at least a portion of each of said contact elements is positioned in front of a portion of said first conductor;

a pressure means connected to a movable body and arranged to abut against said flexible layer, thereby pressing said flexible layer toward said base layer and to be moved on said flexible layer when said movable body is moved substantially along a path defined by said first conductor, so that electrical contact is provided between said first conductor and at least one of said contact elements over which said pressure means passes;

a second elongated electrical conductor which is arranged to be in electrical contact with said at least one contact element when the pressure means passes over said at least one contact element, so that an electrically conducting path is formed between said first conductor and said second conductor through said at least one contact element; and a voltage source connected to one of said first and second conductors, whereby an electrical signal is transmitted through the other of said conductors each time said pressure means passes over a contact element and presses said contact element into electrical contact with at least one of said conductors.

2. A contact device according to claim 1, wherein said first conductor is provided on one of said two layers and said second conductor and said contact elements are provided on the other of said two layers.

3. A contact device according to claim 1, wherein said contact elements are fixed to said second conductor.

4. A contact device according to claim 1, wherein said first conductor and said second conductor are positioned along substantially concentric circular paths.

5. A contact device for delivering electrical signals corresponding to the movement of a movable body, comprising:
  two opposing layers including a base layer and a flexible layer spaced from said base layer by spacing means;
  an electrical input conductor attached to one of said layers said electrical input conductor being electrically connected to a power source;
  a first electrical output conductor for transmitting an electrical signal when said first output conductor is electrically connected to said input conductor, said first output conductor being attached to one of said layers;
  a plurality of first contact elements attached to one of said layers for electrically connecting said input conductor to said first output conductor; and
  a pressure means attached to said movable body, said pressure means moving along a path defined by at least one of said conductors, abutting said flexible layer and displacing said flexible layer toward said base layer, thereby electrically connecting said first input conductor and said first output conductor by means of at least one of said first contact elements, whereby an electrical signal is generated in said first output conductor when said pressure means displaces said flexible layer toward said base layer.

6. The contact device as set forth in claim 5, wherein said input conductor and said first contact elements are attached to one of said opposing layers and said first output conductor is attached to the other of said opposing layers.

7. The contact device as set forth in claim 5, wherein said first contact elements are attached to said input conductor.

8. The contact device as set forth in claim 5, wherein said input conductor and said first output conductor define a substantially circular path for said pressure means to move along.

9. The contact device as set forth in claim 5, further comprising:
  a second electrical output conductor for transmitting an electrical signal when said second output conductor is electrically connected to said input conductor, said second output conductor being attached to one of said opposing layers;
  a plurality of second contact elements attached to one of said opposing layers which electrically connect said input conductor to said second output conductor when said flexible layer is displaced toward said base layer.

10. The contact device as set forth in claim 9, wherein said first and second output conductors are attached to said base layer and have portions which are shaped as concentric circular rings having an intermediate circular space therebetween,
  said input conductor is attached to said flexible layer, and
  said first and second contact elements comprise inward and outward tabs, respectively, on said input conductor.

* * * * *